(12) United States Patent
Spiegel (10) Patent No.: US 12,025,756 B2
(45) Date of Patent: Jul. 2, 2024

(54) OPTIMIZED CHIRP SIGNAL SHAPING FOR ULTRASONIC SENSING SYSTEMS

(71) Applicant: Elmos Semiconductor SE, Dortmund (DE)

(72) Inventor: Egbert Spiegel, Marl (DE)

(73) Assignee: ELMOS SEMICONDUCTOR SE, Dortmund (DE)

(*) Notice: Subject to any disclaimer, the term of this patent is extended or adjusted under 35 U.S.C. 154(b) by 896 days.

(21) Appl. No.: 17/081,303

(22) Filed: Oct. 27, 2020

(65) Prior Publication Data

US 2021/0149032 A1    May 20, 2021

(30) Foreign Application Priority Data

Nov. 14, 2019 (DE) .................. 10 2019 130 810.0
Nov. 29, 2019 (DE) .................. 10 2019 132 483.1

(Continued)

(51) Int. Cl.
*G01S 7/524* (2006.01)
*G01S 15/931* (2020.01)

(52) U.S. Cl.
CPC ............ *G01S 7/524* (2013.01); *G01S 15/931* (2013.01); *G01S 2015/932* (2013.01)

(58) Field of Classification Search
CPC ........ G01S 7/523; G01S 7/524; G01S 15/931; G01S 2015/932; G01S 15/86; G01S 15/104

See application file for complete search history.

(56) References Cited

U.S. PATENT DOCUMENTS 5,278,537 A * 1/1994 Carlo .................. G08B 3/10
340/384.1
11,187,792 B2 * 11/2021 Liem .................. G01S 7/4865
(Continued)

FOREIGN PATENT DOCUMENTS

DE    102017123049 B3    2/2018
DE    102017123050 B3    2/2018
(Continued)

OTHER PUBLICATIONS

German Application No. 102019132483.1, Office Action mailed Jul. 6, 2020, 84 pages.
(Continued)

*Primary Examiner* — Shelby A Turner
*Assistant Examiner* — Yaritza H Perez Bermudez
(74) *Attorney, Agent, or Firm* — Mindful IP PLLC; Michael J. McCandlish (57) ABSTRACT

A method to operate an ultrasonic sensor includes the step of sending an ultrasonic burst as a series of ultrasonic pulses that have a pulse length and a pulse spacing. The sum of the pulse length and pulse spacing represents the pulse period length. The ultrasonic burst starts at a first time and ends at a second time. The current pulse frequency corresponds to an inverse of the current pulse length. The current pulse frequency, during a first time period passes through a first frequency range, in a following middle time period a middle frequency range and in a following second time period a second frequency range. The length of time of the middle time period is equal to or longer than the sum of the first time period and the second time period.

9 Claims, 7 Drawing Sheets

(30) Foreign Application Priority Data

| | | |
|---|---|---|
| Nov. 29, 2019 | (DE) | 10 2019 132 488.2 |
| Aug. 3, 2020 | (DE) | 10 2020 120 416.7 |
| Aug. 3, 2020 | (DE) | 10 2020 120 418.3 |

(56) References Cited

U.S. PATENT DOCUMENTS

| | | | | |
|---|---|---|---|---|
| 2011/0162455 | A1* | 7/2011 | Renzel | G01N 29/343 |
| | | | | 73/632 |
| 2012/0055253 | A1* | 3/2012 | Sinha | G01N 29/222 |
| | | | | 73/622 |
| 2012/0176864 | A1* | 7/2012 | Karl | G01S 7/539 |
| | | | | 367/89 |
| 2015/0323667 | A1* | 11/2015 | Przybyla | G10K 11/346 |
| | | | | 367/103 |
| 2017/0115388 | A1* | 4/2017 | Sathyanarayana | G01S 15/104 |
| 2019/0001139 | A1* | 1/2019 | Mishra | A61N 1/36075 |
| 2020/0209388 | A1* | 7/2020 | Ding | G01S 15/104 |

FOREIGN PATENT DOCUMENTS

| | | | | |
|---|---|---|---|---|
| DE | 102017123051 | B3 | 2/2018 | |
| DE | 102017123052 | B3 | 2/2018 | |
| DE | 102017104145 | A1 | 8/2018 | |
| DE | 102017122477 | A1 * | 3/2019 | G01S 15/104 |
| DE | 102017122477 | A1 | 3/2019 | |
| DE | 102018106251 | A1 | 9/2019 | |
| JP | 2011038948 | A | 2/2011 | |

OTHER PUBLICATIONS

German Application No. 102019132488.2, Office Action mailed Jul. 6, 2020, 86 pages.

* cited by examiner

OPTIMIZED CHIRP SIGNAL SHAPING FOR ULTRASONIC SENSING SYSTEMS

CROSS-REFERENCE TO RELATED APPLICATIONS

This application claims priority to German Application No. DE 10 2019 130 810.0, filed on Nov. 14, 2019, German Application No. DE 10 2019 132 488.2, filed on Nov. 29, 2019, German Application No. DE 10 2019 132 483.1, filed on Nov. 29, 2019, German Application No. DE 10 2020 120 418.3, filed on Aug. 3 2020 and German Application No. DE 10 2020 120 416.7, filed on Aug. 3. 2020, all of which applications are hereby incorporated herein by reference in their entireties.

TECHNICAL FIELD

The disclosure relates to a method for operating an ultrasonic sensor with chirp signals.

BACKGROUND

A method for operating an ultrasonic sensor device for a motor vehicle through varied stimulation of a membrane, and an associated ultrasonic sensor device, a driver assistance system, and a motor vehicle are known from DE 10 2017 104 145 A1. The technical teachings of DE 10 2017 104 145 A1 relate to a method for operating an ultrasonic sensor device for a motor vehicle in which a membrane in a first ultrasonic sensor is stimulated to transmit a first ultrasonic signal, and a membrane in a second ultrasonic sensor is stimulated to transmit a second ultrasonic signal, wherein the membrane in the first ultrasonic sensor and the membrane in the second ultrasonic sensor have the same resonance frequency (f), and wherein the membrane in the first ultrasonic sensor is stimulated with a first frequency ($F_1$) which is lower than the resonance frequency (f) by a predefined frequency difference ($\Delta f$), and the membrane in the second ultrasonic sensor is stimulated with a second frequency ($f_2$), which is higher than the resonance frequency (f) by a predefined frequency difference ($\Delta f$). Furthermore, the idea that the frequency difference ($\Delta f$) is modified on the basis of a control signal that is sent to the first ultrasonic sensor and the second ultrasonic sensor is known from DE 10 2017 104 145 A1. The idea that a first encoding of the first ultrasonic signal from the first ultrasonic sensor and/or a second encoding of the second ultrasonic signal from the second ultrasonic sensor is obtained by means of a frequency modulation, by means of a phase modulation, as a chirp, and/or by means of a digital modulation process is likewise known from DE 10 2017 104 145 A1.

The use of chirp signals is likewise known from DE 10 2017 123 049 B3, DE 10 2017 123 050 B3, DE 10 2017 123 052 B3, and DE 10 2017 123 051 B3. The term "chirp-up" is defined in these documents as a strictly monotonic frequency change of the ultrasonic transmission signal from a lower ultrasonic transmission frequency to a higher ultrasonic transmission frequency, and "chirp-down" is defined as a strictly monotonic frequency change of the ultrasonic transmission signal from a higher ultrasonic transmission frequency to a lower ultrasonic transmission frequency.

Common to all of these documents is that they do not examine or disclose an optimal encoding of the chirp signal.

Chirp-up and chirp-down, as defined in DE 2017 123 049 B3, DE 10 2017 123 050 B3, DE 10 2017 123 052 B3, and DE 10 2017 123 051 B3, have orthogonal signal shapes, but only for very large bandwidth time products. To improve the orthogonality, the chirp signals can also be run at different center frequencies, although this significantly increases the bandwidth requirements.

According to the technical teachings of DE 10 2017 104 145 A1, chirp-up signals and chirp-down signals have orthogonal signal shapes, but only with very large bandwidth time products. In particular, the bandwidth must be very small due to the narrowness of the bandwidth for the ultrasonic transducer (type 7 KHz, e.g. 58 Hz±3.5 kHz). The inventors of DE 2017 104 145 A1 therefore propose in their patent application that the center frequencies of the chirp signals from the two ultrasonic transmitters be pulled apart, thus reducing the spectral overlap.

The minimization of the spectral overlap beyond that of the prior art, without pulling the center frequencies too far apart, in order to minimize the necessary bandwidth, is an object of the disclosure presented herein of the technical teachings described herein.

Figure 5:
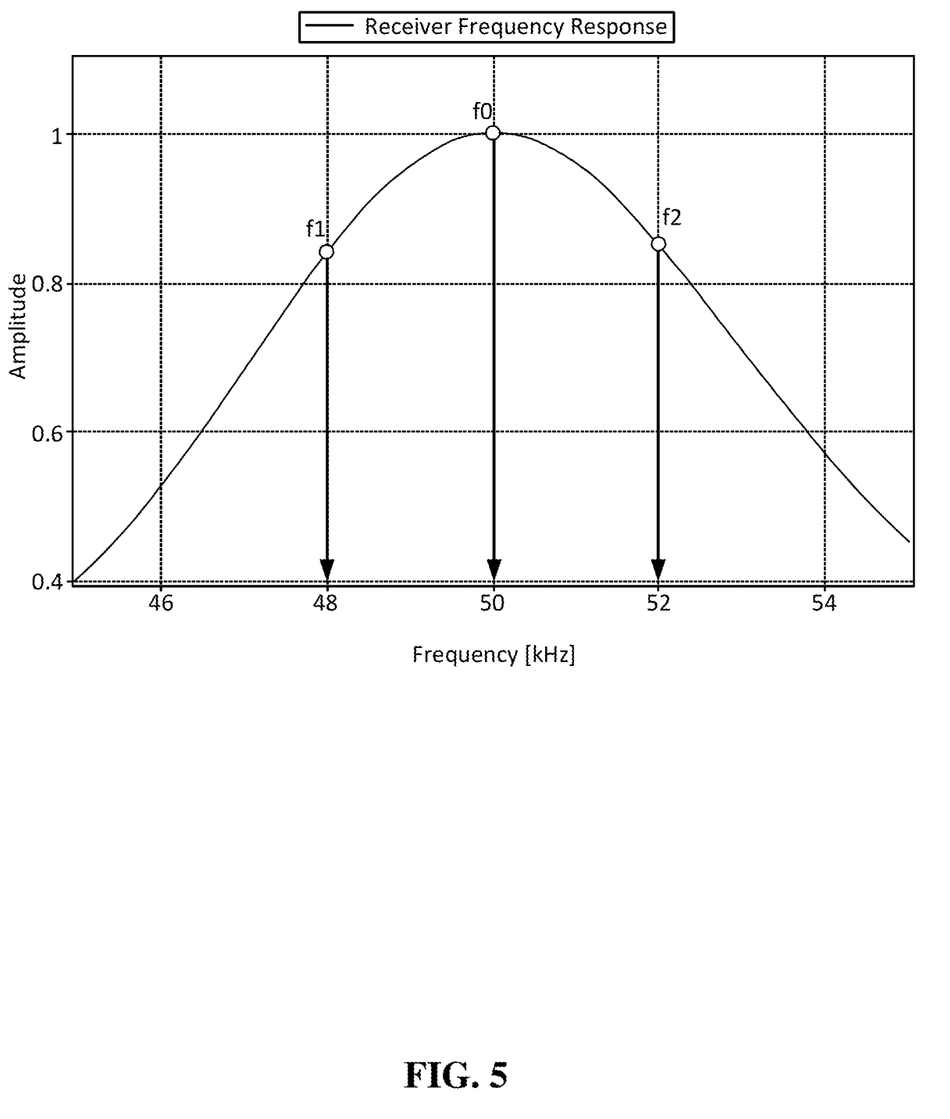
FIG. 5 is a graph of example first and second center frequencies of two respective chirp signals and an example resonant frequency of a ultrasonic sensor.

Practical tests have shown that the method in DE 10 2017 104 145 A1 is ineffective. For it to function, the spectra of the two ultrasonic signals, i.e. the two chirp signals, from the two ultrasonic transmitters, must not overlap, which would result in a signal distortion and reduced amplitudes, because the necessary separation of the center frequencies requires operation of the two ultrasonic sensors far below the resonance frequencies of the ultrasonic sensors, resulting in a massive damping. This is shown in FIG. 5, wherein f1 is the center frequency of a first chirp signal of the two chirp signals, f2 is the center frequency of a second chirp signal of the two chirp signals and f0 is the resonant frequency of the ultrasonic sensors.

The use of non-linear chirps is known from JP 2011-038 948 A. The method for generating an ultrasonic burst in accordance with the technical teachings of JP 2011-038 948 A comprises transmitting an ultrasonic burst as a series of ultrasonic pulses, wherein the current pulse frequencies of the ultrasonic bursts are different at the starts and ends of the bursts, and wherein the temporal changes in the current pulse frequencies are at two different times in the ultrasonic bursts.

A continuous linear change in the current pulse frequency of the course of the transmission of the ultrasonic burst is known from DE 2017 12.2 477 A1. This is used in the technical teachings of DE 2017 122 477 A1 in order to be able to determine an echo of the receiving frequency, whether at least one of numerous echoes are reflected during the transmission phase, or whether this is overreaching.

Regarding the term "ultrasonic burst," reference is made to the explanations in paragraph [0013] in DE 10 2018 106 251 A1.

SUMMARY

An ultrasonic burst is understood herein to be successive fluctuations in the air pressure due to sound waves. An ultrasonic burst comprises numerous ultrasonic pulses. An ultrasonic pulse is characterized by an increase in the air pressure due to sound waves, and a subsequent decrease in the air pressure due to sound waves.

The series of such ultrasonic pulses, which have an ultrasonic series frequency, shall be referred to below as an ultrasonic burst. The temporal spacing between the increase in the air pressure due to sound waves and the decrease in the air pressure due to sound waves is understood herein to be the pulse length ($T_1$). The temporal spacing between the decrease in the air pressure due to sound waves and the increase in air pressure due to sound waves is understood herein to be the pulse spacing ($T_2$). The temporal pulse period length ($T=T_1+T_2$) is then the sum of the pulse length ($T_1$) and the pulse spacing ($T_2$). The current pulse frequency ($f_{m,NL}=|1/T|$) is the inverse of the pulse period length (T).

An object of the disclosure is therefore to create a solution that does not have the above disadvantages of the prior art and does have further advantages. The advantages are not limited to this. This object is achieved with a method as described herein.

First, the simplest, most obvious shape of a chirp, as disclosed in DE 10 2017 123 049 B3, DE 10 201711.23 050 B3, DE 10 2017 123 052 B3 and DE 10 2017 123 051 B3, is a linear chirp in which the frequency change ∂f for each time unit ∂t, i.e. the frequency change speed $$\frac{\partial f}{\partial t},$$

is constant.

In the framework of developing the proposal it was discovered that it is advantageous to work with a frequency change speed $$\frac{\partial f}{\partial t}$$

that is not constant instead of a constant frequency change speed $$\frac{\partial f}{\partial t}.$$

In this manner, the spectra of the two ultrasonic signals can be shaped such that they become narrower. As a result, the spacing of the center frequencies can be smaller. A weighting of the amplitudes is proposed in the technical teachings of DE 10 2017 104 145 A1 for spectral shaping and side lobe reduction.

DESCRIPTION

Examples of the method are disclosed in reference to the FIGS. 1 to 7.

Figure 1:
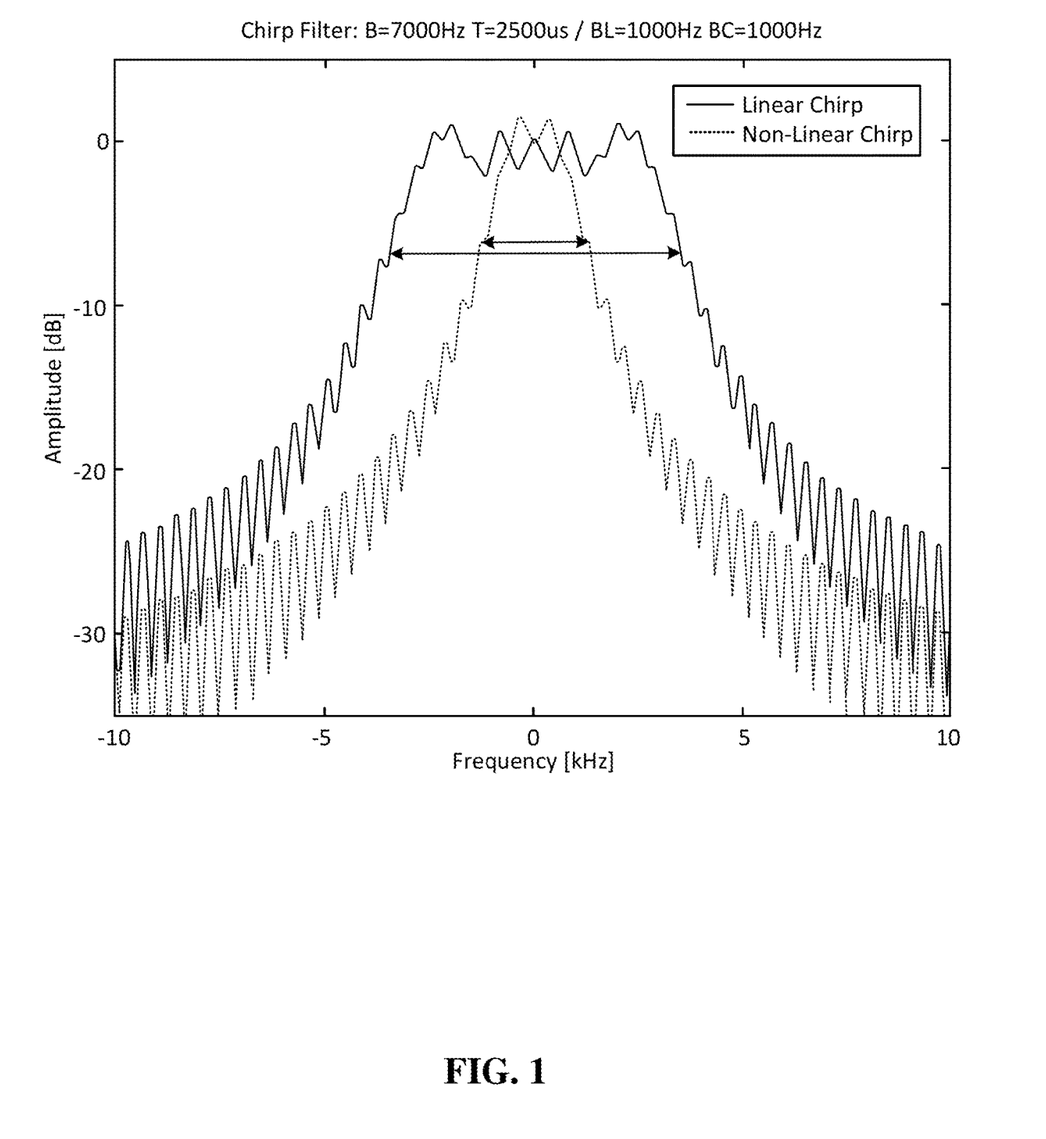
FIG. 1 is a graph illustrating examples of a linear chirp signal and a non-linear chirp signal.

FIG. 1 shows the schematic, simplified spectrum of an ultrasonic transmission signal from an ultrasonic sensor, i.e. a linear chirp signal, with a constant frequency change speed $$\frac{\partial f}{\partial t}$$

(labeled "linear chirp"), and the spectrum of an ultrasonic transmission signal from an ultrasonic transmitter with a frequency change speed $$\frac{\partial f}{\partial t}$$

that is not constant, i.e. a non-linear chirp signal (labeled "non-linear chirp"). As can be readily seen, the spectrum of the non-linear chirp signal is narrower than the spectrum of the linear chirp signal. The preferred non-linear chirp signal shall be explained in greater detail below.

We are assuming that a first ultrasonic sensor that transmits a linear chirp signal with a first center frequency ($f_1$) and a second ultrasonic sensor that transmits a linear chirp signal with a second center frequency ($f_2$) are used. The first center frequency ($f_1$) and the second center frequency ($f_2$) should exhibit a center frequency spacing of ($f_1-f_2=Df_{12}$).

Figure 2:
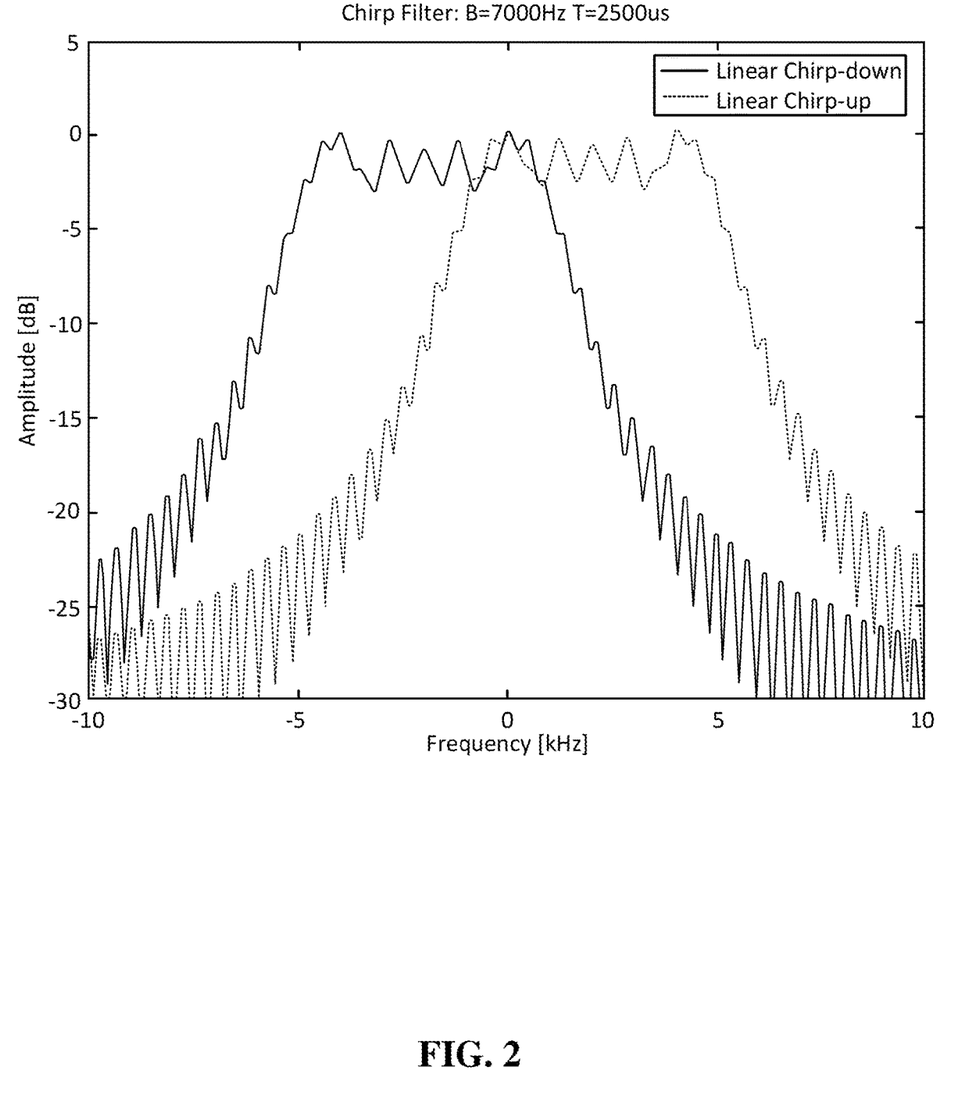
FIG. 2 is a graph illustrating an example of overlapping linear chirp signals.

If this center frequency spacing ($Df_{12}$) is less than the bandwidth of the linear chirp signals, then they overlap. This is shown in FIG. 2.

Figure 3:
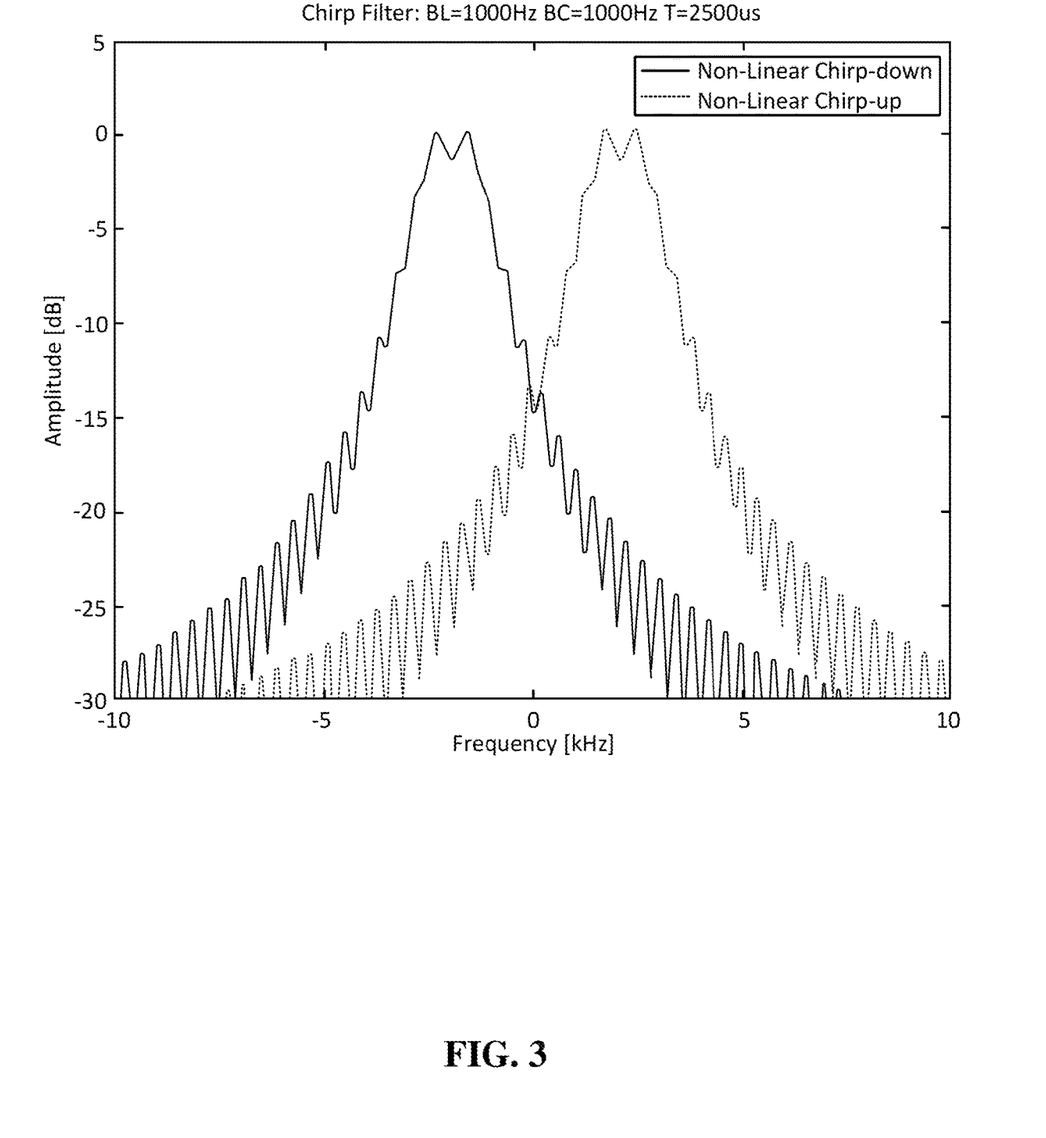
FIG. 3 is a graph illustrating an example of overlapping chirp up and chirp down signals.
Figure 6:
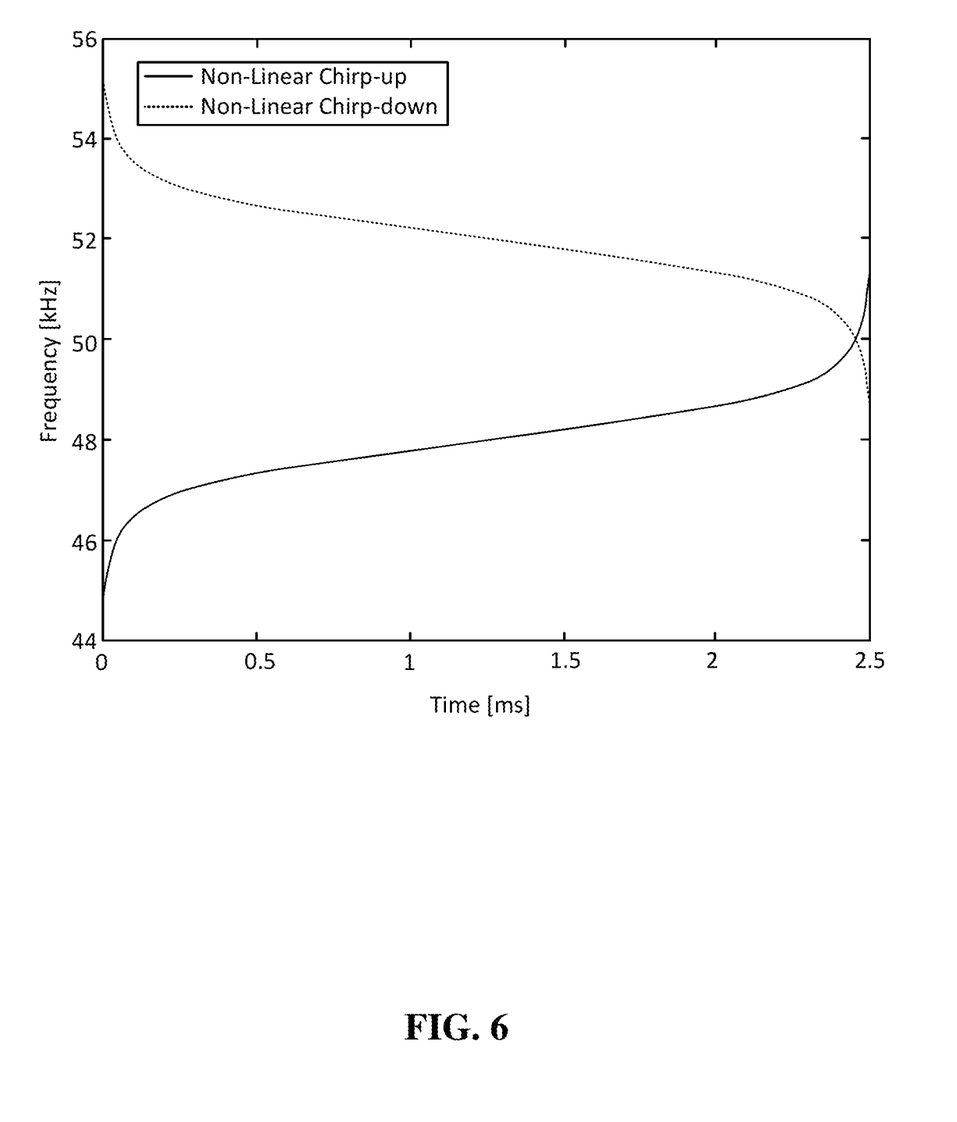
FIG. 6 is a graph of frequency versus time for the example chirp up and chirp down signals of FIG. 3.

If non-linear chirp signals are then used at different starting frequencies, the narrower spectra of the two non-linear chirp signals result in less overlapping of the two chirp signals. This is shown in FIG. 3. The corresponding curves of the frequencies of the non-linear chirp-up signal and the non-linear chirp-down signal over time are shown in FIG. 6.

Figure 4:
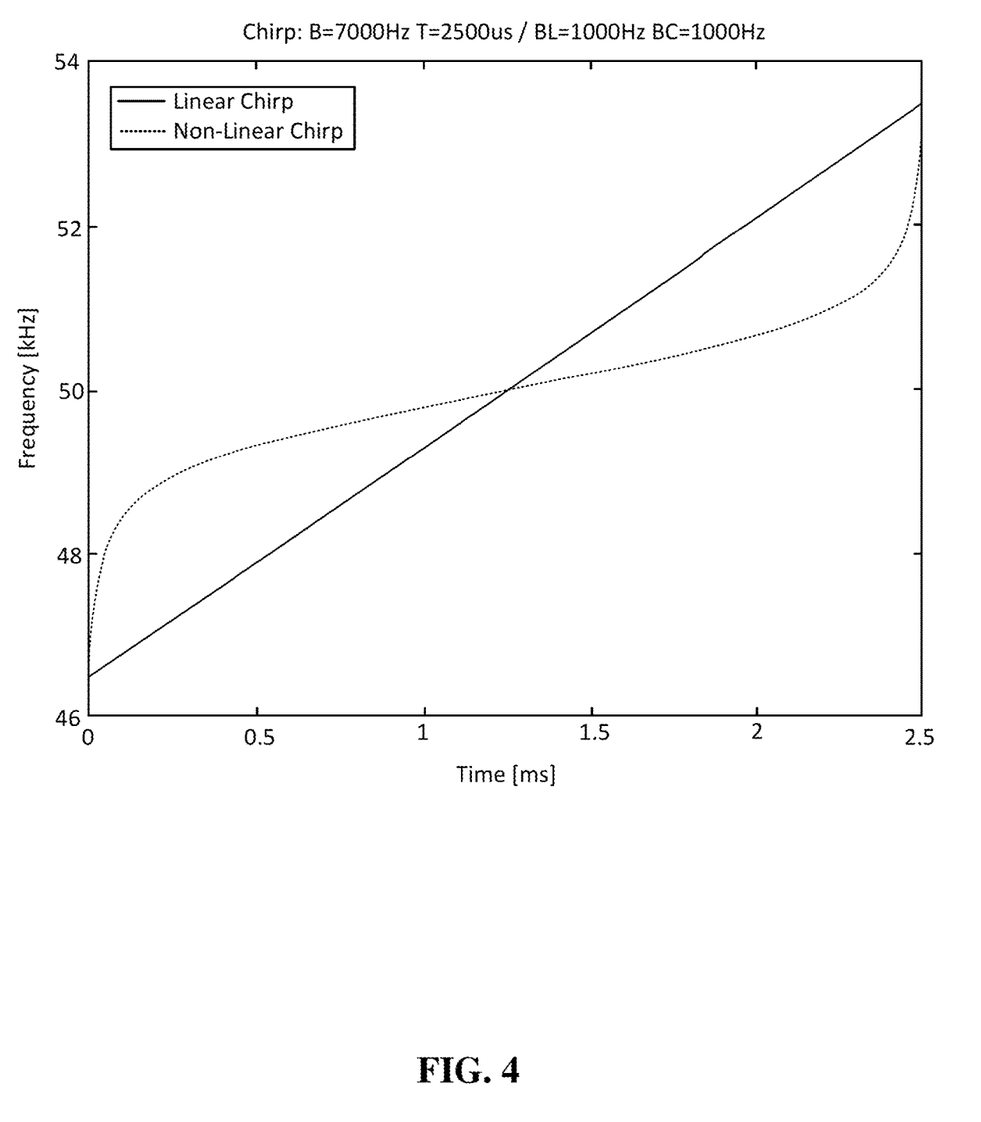
FIG. 4 is a graph of frequency versus time for an example linear chirp signal and an example non-linear chirp signal.

FIG. 4 shows respective exemplary frequency curves over time for a linear chirp signal and a non-linear chirp signal. These correspond to the signal curves shown in FIG. 2.

As disclosed herein, through the use of non-linear chirps, the spectra of the chirp signals can have a narrow band, significantly reducing the bandwidth requirements without worsening the signal/noise ratio.

The disclosure thus describes a method for operating an ultrasonic sensor that comprises the following steps: transmitting an ultrasonic burst as a series of ultrasonic pulses. The ultrasonic pulses have a pulse length ($T_1$) and a pulse spacing ($T_2$). The sum of the pulse length ($T_1$) and the pulse spacing ($T_2$) equals the pulse period length ($T=T_1+T_2$). The ultrasonic burst starts at a first time ($t_1$) and ends at a second time ($t_2$). The current pulse frequency ($f_{m,NL}=|1/T|$) corresponds to the inverse of the pulse period length (T). The pulse period length (T) and thus the current pulse frequency ($f_m=1/T$) at the first time ($t_1$) differ from the pulse period length (T) and thus the current pulse frequency ($f_m=1/T$) at a second time ($t_2$).

The current pulse frequency ($f_{m,NL}(t)$) of a non-linear chirp pulse at a time (t) can be described by the equation:

$$f_{m,NL}(t) = \frac{t}{T}\left(B_L + B_C \frac{1}{\sqrt{1-4\frac{t^2}{T^2}}}\right)$$

The above formula only relates to either times t, between the first time ($t_1$) and the second time ($t_2$), at which an ultrasonic pulse starts in each case; or to times t between the first time ($t_1$) and the second time ($t_2$), at which an ultrasonic pulse ends in each case. In this regard, the above formula does not describe a continuous curve; but instead, discrete values for discrete times t between the first tune ($t_1$) and the second time ($t_2$). Deviations in the current pulse frequency ($f_{m,NL}=(t)$) of less than 10%, preferably 5%, preferably 2%, preferably 1%, preferably 0.5% from this curve are possible in reality. The current pulse frequency ($f_{m,NL}=(t)$) only corresponds substantially to the above formula. The current pulse frequency change $$\left(\frac{\partial f_{m,NL}}{\partial t}\right)$$

at a non-linear chirp pulse is therefore not constant. In the equation, $B_L$ is the coefficient of the bandwidth for the linear portion and $B_C$ is the coefficient of the bandwidth for the non-linear portion.

The current pulse frequency change $$\left(\frac{\partial f_{m,NL}}{\partial t}\right),$$

at at least a third time ($t_3$) between the first time ($t_1$) and the second time ($t_2$), is different than the current pulse frequency change $$\left(\frac{\partial f_{m,NL}}{\partial t}\right)$$

at a fourth time ($t_1$) between the first time ($t_1$) and the second time ($t_2$).

In contrast, the current pulse frequency ($f_{m,NL}=(t)$) of a linear chirp pulse at a time (t) is described with the equation:

$$f_{m,L}(t) = \frac{t}{T}B$$

The current pulse frequency change $$\left(\frac{\partial f_{m,L}}{\partial t}\right)$$

of a linear chirp pulse is therefore constant.

The spectrum of the linear chirp (linear chirp) and the spectrum of the non-linear chirp (non-linear chirp) are shown in FIG. 1.

Alternatively, the proposal can also be characterized as follows: The width of the spectrum of the non-linear chirped ultrasonic burst is to be reduced in reference to a −3 dB level in relation to the maximum amplitude of its spectrum by more than 25%, and/or preferably more than 30% and/or preferably more than 35% with respect to the bandwidth of the spectrum of the linear chirped ultrasonic burst with respect to a −3 dB level in relation to the maximum amplitude of its corresponding spectrum.

The spectrum of the non-linear chirp-up pulse (non-linear chirp up) and the spectrum of the non-linear chirp-down pulse (non-linear chirp down) are shown in FIG. 3.

Alternatively to the two characteristics described above, the proposal can also be characterized in that the spectrum of the non-linear chirp-up pulse at the intersection with the spectrum of the non-linear chirp-down pulse is decreased to at least −12 dB with respect to the maximum. At the same time, the spectrum of the non-linear chirp-down pulse at the intersection with the spectrum of the non-linear chirp-up pulse has decreased to at least −12 dB with respect to the maximum.

In a variation of these three fundamental methods, the current pulse frequency change $$\left(\frac{\partial f_{m,NL}}{\partial t}\right)$$

of me non-linear chirp pulse between the first time ($t_1$) and the second time ($t_2$) increases or decreases monotonically. Particularly preferably, the current pulse frequency change $$\left(\frac{\partial f_{m,NL}}{\partial t}\right)$$

or me non-linear map pulse increases or decreases strictly monotonically between the first time ($t_1$) and the second time ($t_2$).

In a second variation of these three fundamental methods, the temporal change in the current pulse frequency change $$\left(\frac{\partial^2 f_{m,NL}}{\partial t^2}\right)$$

of the non-linear chirp pulse, i.e. the temporal change rate of the current pulse frequency change $$\left(\frac{\partial f_{m,NL}}{\partial t}\right)$$

between the first time ($t_1$) and the second time ($t_2$), decreases or increases monotonically. Particularly preferably, the temporal change in the current pulse frequency change $$\left(\frac{\partial^2 f_{m,NL}}{\partial t^2}\right)$$

of the non-linear chirp pulse, i.e. the temporal change rate of the current pulse frequency change $$\left(\frac{\partial f_{m,NL}}{\partial t}\right)$$

of the non-linear chirp puke between the first time (t1) and the second time (t2) decreases or increases strictly monotonically.

Particularly preferably, the temporal curve of the value of the current pulse frequency change $$\left(\frac{\partial f_{m,NL}}{\partial t}\right)$$

of the non-linear chirp pulse between the first time ($t_1$) and the second time ($t_2$) is a minimum value.

In a third variation of these three fundamental methods, the temporal change in the current pulse frequency change $$\left(\frac{\partial^2 f_{m,NL}}{\partial t^2}\right)$$

of the non-linear chirp pulse between the first time ($t_1$) and the second time ($t_2$) is constant, such that $$\left(\frac{\partial^2 f_{m,NL}}{\partial t^3} = 0\right)$$

applies at this time $t_3$.

Figure 7:
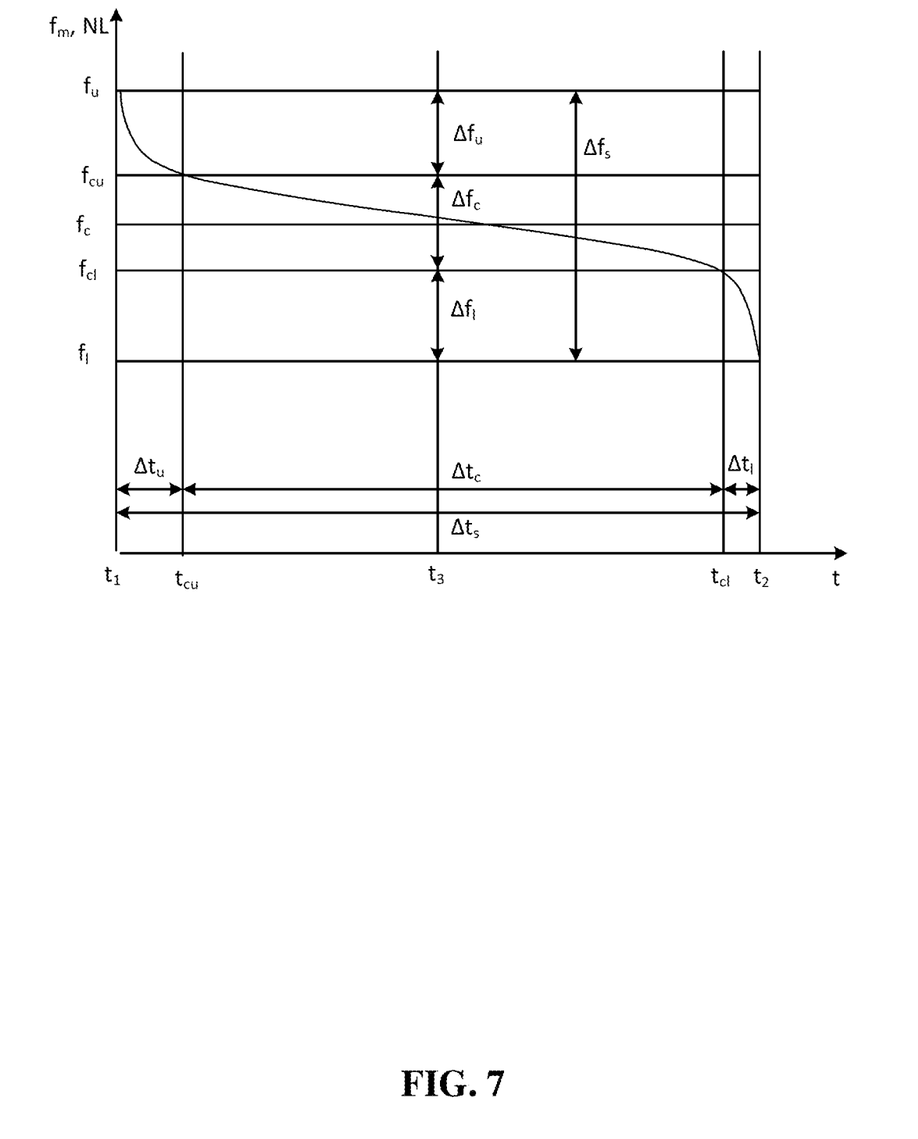
FIG. 7 is a graph of frequency versus time for the example chirp down signal of FIG. 6.

FIG. 7 shows the frequency curve a little better. Only the temporal curve of the current pulse frequency ($f_{m,NL}$) of an exemplary non-linear chirp-down ultrasonic burst is shown in FIG. 7. It corresponds to the chirp-down ultrasonic burst in FIG. 6. The following descriptions apply analogously to an exemplary non-linear chirp-up ultrasonic burst, which shall not be explained further herein. It would correspond to the chirp-up ultrasonic burst in FIG. 6. The temporal sequencing of numerous sub-ultrasonic bursts in the form of an overall ultrasonic burst in accordance with the description presented herein is comprised by the claim.

The methods for operating an ultrasonic sensor described above can also be characterized differently. Another characterization emphasizes that the current pulse frequency ($f_{m,NL}$) only deviates slightly from a mean current pulse frequency ($f_c$) for a longer time. The frequency deviation is only larger for a short time at the start and end of the ultrasonic burst.

Particularly preferably, the mean current pulse frequency ($f_c$) of the ultrasonic burst does not deviate from the frequency of the ultrasonic transmitter and/or ultrasonic transducer that are used. If the current pulse frequency ($f_c$) only deviates from this resonance frequency for a relatively short time during the transmission of the ultrasonic burst, the ultrasonic transmitter or ultrasonic transducer can transmit at nearly maximum transmission power over a relatively long period of time within the time period for transmitting the ultrasonic burst. As a result, the range of the system is maximized when used in an ultrasonic parking assistance system in an automobile, and significantly exceeds those of systems that have a linear chirp. This alignment of the resonance frequency of the ultrasonic transducer, or ultrasonic transmitter, and the mean current pulse frequency ($f_c$) can be expressed quantitatively. The frequency as set forth in this disclosure can be assumed to be the resonance frequency of an ultrasonic transducer or an ultrasonic transmitter, for which the acoustic power of the acoustic radiation from the relevant ultrasonic transducer or relevant ultrasonic transmitter is a maximum. Particularly preferably, the mean current pulse frequency ($f_c$) of the ultrasonic burst deviates no more than 10%, and/or preferably no more than 5%, and/or preferably no more than 2%, and/or preferably no more than 1%, and/or preferably no more than 0.5%, and/or preferably no more than 0.1%, and/or preferably no more than 0.05%, and/or preferably no more than 0.02%, and/or preferably no more than 0.01%, from the resonance or nominal frequency of an ultrasonic transmitter, and/or no more than 10%, and/or preferably no more than 5%, and/or preferably no more than 2%, and/or preferably no more than 1%, and/or preferably no more than 0.5%, and/or preferably no more than 0.1%, and/or preferably no more than 0.05%, and/or preferably no more than 0.02%, and/or preferably no more than 0.01%, from the resonance or nominal frequency of an ultrasonic transducer in the ultrasonic burst transmission process proposed herein.

As before, the transmission of an ultrasonic burst takes the form of a transmission of a series of ultrasonic pulses that have a pulse length ($T_1$) and a pulse spacing ($T_2$). The pulse length ($T_1$) and the pulse spacing ($T_2$) are combined to form the pulse period length ($T=T_1+T_2$) starting at the start of one pulse, and ending at the start of the subsequent pulse. The ultrasonic burst starts at a first time ($t_1$) and ends at a second time ($t_2$). The start of the ultrasonic burst begins at the start of the first pulse in the ultrasonic burst. The ultrasonic burst ends, as set forth in this document, after a time has elapsed that corresponds to the pulse spacing ($T_2$) between the last pulse in the ultrasonic burst and the second-to-last pulse in the ultrasonic burst, wherein this time has elapsed beginning at the end of the last pulse in the ultrasonic burst. The time at which this time has elapsed is then the second time ($t_2$), as set forth herein.

Accordingly, the ultrasonic burst has a temporal ultrasonic burst length ($\Delta t_s = t_2 - t_1$). The current pulse frequency ($f_{m,NL} = |1/T|$) corresponds to the inverse of the current pulse period length ($T$) at a time ($t$) during the ultrasonic burst ($t_1 \le t \le t_2$). The pulse period length ($T$), and therefore the current pulse frequency ($f_{m,NL} = |1/T|$) at the first time ($t_1$) is referred to below as the first current pulse frequency ($f_u$), and the pulse period length ($T$), and thus the current pulse frequency ($f_{m,NL} = |1/T|$) at the second time ($t_1$) is referred to below as the second current pulse frequency ($f_l$). The first current pulse frequency ($f_u$) is preferably different than the second current pulse frequency ($f_l$). The ultrasonic burst has a mean current pulse frequency ($f_c = f_u - f_l/2$), as specified above. The total change in the current pulse frequency ($f_{m,NL} = |1/T|$) between the first time ($t_1$) and the second time ($t_2$) is referred to below as the total frequency change ($\Delta f_s$).

The first boundary frequency ($f_{cu}$) is the frequency that has a frequency value at a spacing to the first current pulse frequency ($f_u$) that is one half of the spacing to the second current pulse frequency ($f_l$) for the frequency value. The second boundary frequency ($f_{cl}$) is the frequency that has a frequency value at a spacing to the second current pulse frequency ($f_l$) that is one half of the spacing to the first current pulse frequency ($f_u$) for the frequency value. The current pulse frequency ($f_{m,NL}$) is preferably the same as the first boundary frequency ($f_{cu}$) at a first boundary time ($t_{cu}$). The current pulse frequency ($f_{m,NL}$) is preferably the same as the second boundary frequency ($f_{cl}$) at a second boundary time ($t_{cl}$). The first boundary time ($t_{cl}$) preferably follows the first time ($t_1$), and the second boundary time ($t_{cl}$) preferably follows the first boundary time ($t_{cu}$), and the second time ($t_2$) preferably follows the second boundary time ($t_{cl}$).

The current pulse frequency ($f_{m,NL}$) during a first time period ($\Delta t_u$), which begins at the first time ($t_1$) and ends at the first boundary time ($t_{cu}$), is preferably between the first current pulse frequency ($f_u$) and the first boundary frequency ($f_{cu}$) in a first frequency range ($\Delta f_u$) between the first current pulse frequency ($f_u$) and the first boundary frequency ($f_{cu}$). The current pulse frequency ($f_{m,NL}$) during a middle time period ($\Delta t_c$), which begins at the first boundary time ($t_{cu}$) and ends at the second boundary time ($t_{cl}$), is preferably located between the first boundary frequency ($f_{cu}$) and the second boundary frequency ($f_{cl}$) in a middle frequency range ($\Delta f_c$) between the first boundary frequency ($f_{cu}$) and the second boundary frequency ($f_{cl}$). The current pulse frequency ($f_{m,NL}$) during a second time period ($\Delta t_l$), which begins at the second boundary time ($t_{cl}$) and ends at the second time ($t_2$) is preferably located between the second boundary frequency ($f_{cl}$) and the second current pulse frequency ($f_l$) in a second frequency range ($\Delta f_l$) between the first current pulse frequency ($f_u$) and the first boundary frequency ($f_{cu}$).

It is decisive here that the length of the middle time period ($\Delta t_c$) is greater than the sum of the length of the first time period ($\Delta t_u$) and the length of the second time period ($\Delta t_l$), or that the length of the middle time period ($\Delta t_c$) equals the sum of the length of the first time period ($\Delta t_u$) and the length of the second time period ($\Delta t_l$). The focus of the acoustic transmission can first be placed on the resonance frequency of the ultrasonic transducer or the ultrasonic transmitter by this means, which then maximizes the range of an ultrasonic parking assistance system.

The current pulse frequency change $$\left(\frac{\partial f_{m,NL}}{\partial t}\right)$$

at at least a third time ($t_3$) between the first time ($t_1$) and the second time ($t_2$) is therefore preferably different than the current pulse frequency changes $$\left(\frac{\partial f_{m,NL}}{\partial t}\right)$$

at at least a fourth time ($t_4$) between the first time ($t_1$) and the second time ($t_2$).

The current pulse frequency ($f_{m,NL}(t)$) between the first time ($t_1$) and the second time ($t_2$) is preferably described with the equation $$f_{m,NL}(t) = \frac{t}{T}\left(B_L + B_C \frac{1}{\sqrt{1-4\frac{t^2}{T^2}}}\right)$$

where $B_L$ is the coefficient of the bandwidth for a linear portion and $B_C$ is the coefficient of the bandwidth for a non-linear portion.

The current pulse frequency change $$\left(\frac{\partial f_{m,NL}}{\partial t}\right)$$

between the first time ($t_1$) and the second time ($t_2$) again decreases or increases monotonically.

The temporal change in the current pulse frequency change $$\left(\frac{\partial^2 f_{m,NL}}{\partial t^2}\right)$$

between the first time ($t_1$) and the second time ($t_2$) preferably increases or decreases monotonically.

The temporal change in the current pulse frequency change $$\left(\frac{\partial^2 f_{m,NL}}{\partial t^2}\right)$$

between the first time ($t_1$) and the second time ($t_2$) can also be constant.

The temporal change of the temporal change in the current pulse frequency change $$\left(\frac{\partial^3 f_{m,NL}}{\partial t^3}\right)$$

between the first time ($t_1$) and the second time ($t_2$) can likewise be constant.

The spectral width of the spectrum of the ultrasonic burst, with respect to a −3 dB level in relation to the amplitude maximum of the spectrum of the ultrasonic burst is preferably reduced by more than 25%, and/or more preferably more than 30%, and/or more preferably more than 35% with respect to the width of the spectrum of the ultrasonic burst that has a constant current pulse frequency change $$\left(\frac{\partial f_{m,NL}}{\partial t}\right)$$

in relation to its −3 dB level with respect to its amplitude maximum of the spectrum of this ultrasonic burst that has a constant current pulse frequency change $$\left(\frac{\partial f_{m,NL}}{\partial t}\right).$$

As explained above, the transmission of an overall ultrasonic burst can take place as a temporal direct sequencing of transmission of sub-ultrasonic bursts, wherein at least the transmission of a sub-ultrasonic burst of this sub-ultrasonic burst is better than all of the sub-ultrasonic bursts corresponding to any of the previously described methods.

Accordingly, Instead of weighting the amplitudes, which also reduces the signal/noise ratio, the dwell time of the ultrasonic transmitter system can also be optimized to the individual current pulse frequencies ($f_m$), in order to give the spectrum an optimal shape. This leads to the use of non-linear chirps. Practical tests have shown that the spacing between the center frequencies of the spectra of two different ultrasonic bursts can be reduced from e.g. 7 kHz to 4 kHz by this. The non-linear chirp signals can even slightly overlap in this case. The signal amplitudes and the signal shapes (including side lobe reduction) and the signal/noise ratio are better.

Because the mean current pulse frequency ($f_c$) of the ultrasonic burst preferably does not deviate from the frequency of the ultrasonic transmitter and/or ultrasonic transducer that is used, and because the current pulse frequency ($f_c$) only deviates for a relatively short time during the transmission of the ultrasonic burst, and only deviates a little from this resonance frequency, the ultrasonic transmitter, or the ultrasonic transducer can transmit at nearly the maximal transmission power over a relatively long time period within the time period of the transmission of the ultrasonic burst. As a result, the range of the system is maximized when used in an ultrasonic parking assistance system in an automobile, and significantly exceeds that of systems that have linear chirps.

What is claimed is:

1. A method for operating an ultrasonic sensor, comprising:
transmitting a total ultrasonic burst as a direct temporal succession of transmissions of partial ultrasonic bursts,
wherein at least the transmission of a partial ultrasonic burst of these partial ultrasonic bursts comprising transmitting the partial ultrasonic burst as a series of ultrasonic pulses that have a pulse length ($T_1$) and a pulse spacing ($T_2$),
wherein the pulse length ($T_1$) and the pulse spacing ($T_2$) combined equal a pulse period length ($T=T_1+T_2$), and
wherein the partial ultrasonic burst starts at a first time ($t_1$) and ends at a second time ($t_2$), and
wherein a current pulse frequency ($f_{m,NL}=1/T$) corresponds to an inverse of the pulse period length (T),
and wherein a first respective pulse period length (T) and therefore a first respective current pulse frequency ($f_{m,NL}=1/T$) at the first time ($t_1$) is different than a second respective pulse period length (T) and therefore a second respective current pulse frequency ($f_{m,NL}=1/T$) at the second time ($t_2$),
wherein a change in the current pulse frequency $$\left(\frac{\partial f_{m,NL}}{\partial t}\right)$$

at at least a third time ($t_3$) between the first time ($t_1$) and the second time ($t_2$) is different than a change in the current pulse frequency $$\left(\frac{\partial f_{m,NL}}{\partial t}\right)$$

at at least a fourth time ($t_4$) between the first time ($t_1$) and the second time ($t_2$), and
wherein a change in the current pulse frequency $$\left(\frac{\partial f_{m,NL}}{\partial t}\right)$$

between consecutive pulses at a center frequency of the total ultrasonic burst is less than a change of the current pulse frequency $$\left(\frac{\partial f_{m,NL}}{\partial t}\right)$$

between an initial pulse in the total ultrasonic burst and a consecutive second pulse at a beginning of the total ultrasonic burst and less than a change of the current pulse frequency $$\left(\frac{\partial f_{m,NL}}{\partial t}\right)$$

between a next-to-last pulse in the total ultrasonic burst and a consecutive last pulse at an end of the total ultrasonic burst.

2. A method for operating an ultrasonic sensor, comprising:
transmitting an ultrasonic burst as a series of ultrasonic pulses with a pulse length ($T_1$) and a pulse spacing ($T_2$),
wherein a sum of the pulse length ($T_1$) and the pulse spacing ($T_2$) represent a pulse period length ($T=T_1+T_2$), and
wherein the ultrasonic bursts starts at a first time ($t_1$) and ends at a second time ($t_2$), and
wherein a current pulse frequency ($f_{m,NL}(t)$) is described with the equation $$f_{m,NL}(t) = \frac{t}{T}\left(B_L + B_C \frac{1}{\sqrt{1-4\frac{t^2}{T^2}}}\right)$$

where t is time and T is the pulse period length, and
wherein $B_L$ is a coefficient of a bandwidth for a linear portion and $B_C$, is a coefficient of the bandwidth for a non-linear portion.

3. The method according, to claim 2,
wherein a current pulse frequency change $$\left(\frac{\partial f_{m,NL}}{\partial t}\right)$$

between the first time ($t_1$) and the second time ($t_2$) decreases or increases monotonically.

4. The method according, to claim 2,
wherein a temporal change of a current pulse frequency change $$\left(\frac{\partial^2 f_{m,NL}}{\partial t^2}\right)$$

between the first time ($t_1$) and the second time ($t_2$) decreases or increases monotonically.

5. The method according to claim 2,
wherein a temporal change of the current pulse frequency change $$\left(\frac{\partial^2 f_{m,NL}}{\partial t^2}\right)$$

between the first time ($t_1$) and the second time ($t_2$) at at least a time $t_3$, where $t_1 < t_3 < t_2$ is constant, such that $$\left(\frac{\partial^2 f_{m,NL}}{\partial t^3} = 0\right)$$

amines at $t_3$.

6. A method for operating an ultrasonic sensor, comprising:
    transmitting a total ultrasonic burst as a direct temporal sequencing of transmissions of sub-ultrasonic bursts,
    wherein at least the transmission of one sub-ultrasonic burst of these sub-ultrasonic bursts corresponds to the method according to claim 2.

7. A method for operating an ultrasonic sensor, comprising
    transmitting a total ultrasonic burst as a direct temporal succession of transmissions of partial ultrasonic bursts,
    wherein at least the transmission of a partial ultrasonic burst of these partial ultrasonic bursts comprises transmitting a partial ultrasonic burst as a series of ultrasonic pulses that have a pulse length ($T_1$) and a pulse spacing ($T_2$),
    wherein the pulse length ($T_1$) and the pulse spacing ($T_2$) combined equal a pulse period length ($T=T_1 \pm T_2$), and
    wherein the partial ultrasonic burst starts at a first time ($t_1$) and ends at a second time ($t_2$), and
    wherein the partial ultrasonic burst has a temporal ultrasonic burst length ($\Delta t_s = t_2 - t_1$), and
    wherein the current pulse frequency ($f_{m,NL} = |1/T|$) corresponds to an inverse of the current pulse period length (T) at a time (t) during the partial ultrasonic burst ($t_1 \le t \le t_2$), and
    wherein the pulse period length (T), and therefore the current pulse frequency ($f_{m,NL} = |1/T|$) at the first time ($t_1$), is then referred to as a first current pulse frequency ($f_u$), and
    wherein the pulse period length (T), and therefore the current pulse frequency ($f_{m,NL} = |1/T|$) at the second time ($t_2$), is then referred to as a second current pulse frequency ($f_1$), and
    wherein the first current pulse frequency ($f_u$) is different than the second current pulse frequency ($f_1$), and
    wherein the partial ultrasonic burst has a middle current pulse frequency ($f_c = |f_u - f_1|/2$), and
    wherein a total change in the current pulse frequency ($f_{m,NL} = |1/T|$) between the first time ($t_1$) and the second time ($t_2$) is then referred to as the total change in frequency ($\Delta f_s$), and
    wherein the first boundary frequency ($f_{cu}$) is the frequency that has a frequency spacing to the first current pulse frequency ($f_u$) that is one half of the frequency spacing to the second current pulse frequency ($f_1$), and
    wherein the second boundary frequency ($f_{c1}$) is the frequency that has a frequency spacing to the second current frequency ($f_1$) that is one half of the frequency spacing to the first current pulse frequency ($f_u$), and
    wherein the current pulse frequency ($f_{m,NL}$) at a first boundary time ($t_{cu}$) equals the first boundary frequency ($f_{cu}$), and
    wherein the current pulse frequency ($f_{m,NL}$) at a second boundary time ($t_{cu}$) equals the second boundary frequency ($f_{cu}$), and
    wherein the first boundary time ($t_{cu}$) follows the first time ($t_1$), and
    wherein the second boundary time ($t_{c1}$) follows the first boundary time ($t_{cu}$), and
    wherein the second time ($t_2$) follows the second boundary time ($t_{c1}$), and
    wherein the current pulse frequency ($f_{m,NL}$) during a first time period ($\Delta t_u$), which starts at the first time ($t_1$) and ends at the first boundary time ($t_{cu}$), is located between the first current pulse frequency ($f_u$) and the first boundary frequency ($f_{cu}$) in a first frequency range ($\Delta f_u$) between the first current pulse frequency ($f_u$) and the first boundary frequency ($f_{cu}$), and
    wherein the current pulse frequency ($f_{m,NL}$) during a middle time period ($\Delta t_c$), which starts at the first boundary time ($t_{cu}$) and ends at the second boundary time ($t_{c1}$), is located between the first boundary frequency ($f_{cu}$) and the second boundary frequency ($f_{c1}$) in a middle frequency range ($\Delta f_c$) between the first boundary frequency ($f_{cu}$) and the second boundary frequency ($f_{c1}$), and
    wherein the current pulse frequency ($f_{m,NL}$) during a second time period ($\Delta t_1$), which begins at the second boundary time ($t_{c1}$) and ends at the second time ($t_2$), is located between the second boundary frequency ($f_{c1}$) and the second current pulse frequency ($f_1$) in a second frequency range ($\Delta f_1$) between the first current pulse frequency ($f_u$) and the first boundary frequency ($f_{cu}$), and
    wherein the length of the middle time period ($\Delta t_c$) is greater than the sum of the length of the first time period ($\Delta t_u$) and the length of the second time period ($\Delta t_1$), or wherein the length of the middle time period ($\Delta t_c$) equals the sum of the length of the first time period ($\Delta t_u$) and the length of the second time period ($\Delta_1$).

8. A method for operating an ultrasonic sensor, comprising the steps
    transmitting an ultrasonic burst as a series of ultrasonic pulses that have a pulse length ($T_1$) and a pulse spacing ($T_2$),
    wherein the sum of the pulse length ($T_1$) and pulse spacing ($T_2$) represents the pulse period length ($T = T_1 + T_2$), and
    wherein the ultrasonic burst starts at a first time ($t_1$) and ends at a second time ($t_2$), and
    wherein the ultrasonic burst has a temporal ultrasonic burst length ($\Delta t_s = t_2 - t_1$), and
    wherein a current pulse frequency ($f_{m,NL} = |1/T|$) corresponds to an inverse of the current pulse period length (T) at a time (t) during the ultrasonic burst ($t_1 \le t \le t_2$), and
    wherein the pulse period length (T), and thus the current pulse frequency ($f_{m,NL} = |1/T|$) at the first time ($t_1$) is referred to below as a first current pulse frequency ($f_u$), and
    wherein the pulse period length (T), and thus the current pulse frequency ($f_{m,NL} = |1/T|$) at the second time ($t_2$) is referred to below as a second current pulse frequency ($f_l$), and
    wherein the first current pulse frequency ($f_u$) differs from the second current pulse frequency ($f_l$), and
    wherein the ultrasonic burst has a middle current pulse frequency ($f_c = |f_u + f_l|/2$), and
    wherein a total change in the current pulse frequency ($f_{m,NL} = |1/T|$) between the first time ($t_1$) and the second time ($t_2$) is referred to as the total frequency change ($\Delta f_s$), and
    wherein a first boundary frequency ($f_{cu}$) is a first frequency, a first frequency spacing to the current pulse frequency ($f_u$) of which is one half of a second frequency spacing to the second current pulse frequency ($f_l$), and
    wherein a second boundary frequency ($f_{cl}$) is a second frequency, a third frequency spacing to the current pulse frequency ($f_l$) of which is one half of a fourth frequency spacing to the first current pulse frequency ($f_u$), and wherein a current pulse frequency ($f_{m,NL}$) at a first boundary time ($t_{cu}$) is the same as the first boundary frequency ($f_{cu}$), and wherein the current pulse frequency ($f_{m,NL}$) at a second boundary time ($t_{cl}$) is the same as the second boundary frequency ($f_{cl}$), and wherein the first boundary time ($t_{cu}$) follows the first time ($t_1$), and wherein the second boundary time ($t_{cl}$) follows the first boundary time ($t_{cu}$), and wherein the current pulse frequency ($f_{m,NL}$) during a first time period ($\Delta t_u$), starting at the first time ($t_1$) and ending at the first boundary time ($t_{cu}$), is located between the first current pulse frequency ($f_u$) and the first boundary frequency ($f_{cu}$) in a first frequency range ($\Delta f_u$) between the first current pulse frequency ($f_u$) and the first boundary frequency ($f_{cu}$), and wherein the current pulse frequency ($f_{m,NL}$) during a middle time period ($\Delta t_u$), which starts at the first boundary time ($t_{cu}$) and ends at the second boundary time ($t_{cl}$), is located between the first boundary frequency ($f_{cu}$) and the second boundary frequency ($f_{cl}$) in a middle frequency range ($\Delta f_c$), and wherein the current pulse frequency ($f_{m,NL}$) during a second time period ($\Delta t_1$), which starts at the second boundary time ($t_{cl}$) and ends at the second time ($t_2$), is located between the second boundary frequency ($f_{c1}$) and the second current pulse frequency ($f_l$) in a second frequency range ($\Delta f_1$) between the first current pulse frequency ($f_u$) and the first boundary frequency ($f_{cu}$), and wherein a length of the middle time period ($\Delta t_c$) is greater than a sum of a length of the first time period ($\Delta t_u$) and a length of the second time period ($\Delta t_1$), or wherein the length of the middle time period ($\Delta t_c$) equals the sum of the length of the first time period ($\Delta t_u$) and the length of the second time period ($\Delta t_1$) and wherein the current pulse frequency ($f_{m,NL}(t)$) is described with the equation $$f_{m,NL}(t) = \frac{t}{T}\left(B_L + B_C \frac{1}{\sqrt{1-4\frac{t^2}{T^2}}}\right)$$

wherein $B_L$ is a coefficient of a bandwidth for a linear portion and $B_C$ is a coefficient of the bandwidth for a non-linear portion.

9. A method for operating an ultrasonic sensor, comprising:
transmitting a total ultrasonic burst as a temporally direct sequencing of transmission of sub-ultrasonic bursts,
wherein at least the transmission of one of the sub-ultrasonic bursts of these sub-ultrasonic bursts corresponds to the method according to claim 8.

* * * * *